United States Patent [19]
Harrison et al.

[11] Patent Number: 5,473,557
[45] Date of Patent: Dec. 5, 1995

[54] COMPLEX ARITHMETIC PROCESSOR AND METHOD

[75] Inventors: Calvin W. Harrison, Austin, Tex.;
Susan L. Gilfeather, Scottsdale, Ariz.;
John B. Gehman, Jr., Scottsdale, Ariz.;
James E. Greenwood, Jr., Scottsdale, Ariz.; Bruce A. Fette, Mesa, Ariz.

[73] Assignee: Motorola, Inc., Schaumburg, Ill.

[21] Appl. No.: 257,314

[22] Filed: Jun. 9, 1994

[51] Int. Cl.$^6$ .................................................. G06F 7/38
[52] U.S. Cl. ............................................ 364/736; 364/748
[58] Field of Search ...................................... 364/736, 748

[56] References Cited

U.S. PATENT DOCUMENTS

| 4,773,006 | 9/1988 | Kinoshita et al. | 364/736 |
| 4,858,164 | 8/1989 | Schildhorn | 364/736 |
| 4,967,343 | 10/1990 | Ngai et al. | 364/736 |
| 5,201,056 | 4/1993 | Daniel et al. | 364/736 |
| 5,307,300 | 4/1994 | Komoto et al. | 364/736 |

OTHER PUBLICATIONS

An article entitled "Digital Signal Processor", Reference Code SMT90033 © Sharp Corp. Jul. 1992 Printed USA, Final Data Sheet, pp. 1–29.

An article entitled "DSP Address Generator", Reference Code SMT90062 © Sharp Corp. Nov. 1992 Printed USA, Data Sheet, Rev A, Sep. 30, 1992, pp. 1–35.

An article entitled "Frequency Domain Array Processor", Preliminary User's Guide Revision Mar. 1991, Array Microsystems, Colorado Springs, Colo., including sections I–V.

Primary Examiner—Tan V. Mai
Attorney, Agent, or Firm—Jeffrey D. Nehr

[57] ABSTRACT

A complex arithmetic processor and method includes a host interface for distributing data, a left memory and a right memory each coupled to the host interface, and a Z memory coupled to the host interface. The left memory and the right memory store the data and the Z memory stores Z memory data. A right/left switch is coupled to the left memory and to the right memory and makes left memory a data source and a right memory a data destination in a first setting, and makes the right memory the data source and the left memory the data destination in a second setting. An arithmetic engine is coupled to the host interface, to the Z memory, and to the left and right memories. The arithmetic engine uses the data and the Z memory data to perform an operation on the data to produce a result.

17 Claims, 3 Drawing Sheets

COMPLEX ARITHMETIC PROCESSOR AND METHOD

FIELD OF THE INVENTION

This invention relates in general to arithmetic processing and in particular to complex arithmetic processing and high speed digital signal processing applications.

BACKGROUND OF THE INVENTION

High speed digital signal processors (DSPs) in communication system applications require low power implementations of high performance DSP capabilities, especially for hand-held devices. Such DSPs must be capable of efficiently performing the spectral analysis and digital filtering required for hand-held spread spectrum communication equipment, high speed modems and digital radios. These applications require matrix math operations, complex arithmetic operations, Fast Fourier Transform (FFT) calculations, encoding/decoding, searching and sorting. High speed modems usually process signals as vectors, that is, complex numbers. DSP processors should therefore be efficient at processing complex numbers.

Two main factors govern the rate at which data can be processed. The first factor is the rate at which data can be fetched and stored to memory. The second factor is the power of the arithmetic engine to process the data streams. If these two factors are properly matched to each other, efficient processing takes place. Optimization requires that a DSP arithmetic engine use many resources efficiently. For example, for execution of the complex multiply function:

$$(x_1+iy_1)(x_2+iy_2)=(x_1x_2-y_1y_2)+i(x_1y_2+y_1x_2)$$

four data operands are fetched, four real multiplications and two real additions are performed and two results stored in the same instruction. More multipliers and adders would not improve the speed, and fewer would require more instructions.

Conventional single chip, low power DSPs do not have the processing power required for many signal processing applications. They operate on a maximum of two data streams and can only perform a single multiply, add and subtract. Typically such DSPs require two clocks per instruction because data is read from and stored to the same physical memory.

What is needed is a high performance, low power, complex arithmetic processor (CAP) in a DSP suitable architecture that can support the throughput of a high performance pipelined arithmetic engine optimized for higher radix FFTs, complex multiplication and high speed data sorting. It is desirable to have a CAP or DSP that can compute complex multiplications at the processor clock rate, which is eight times more efficient than typical DSPs.

DETAILED DESCRIPTION OF THE DRAWINGS

Executing instructions at the processor clock rate requires special design considerations. These considerations include decoding, data bandwidth and program execution of nested hardware DO loops.

Figure 1:
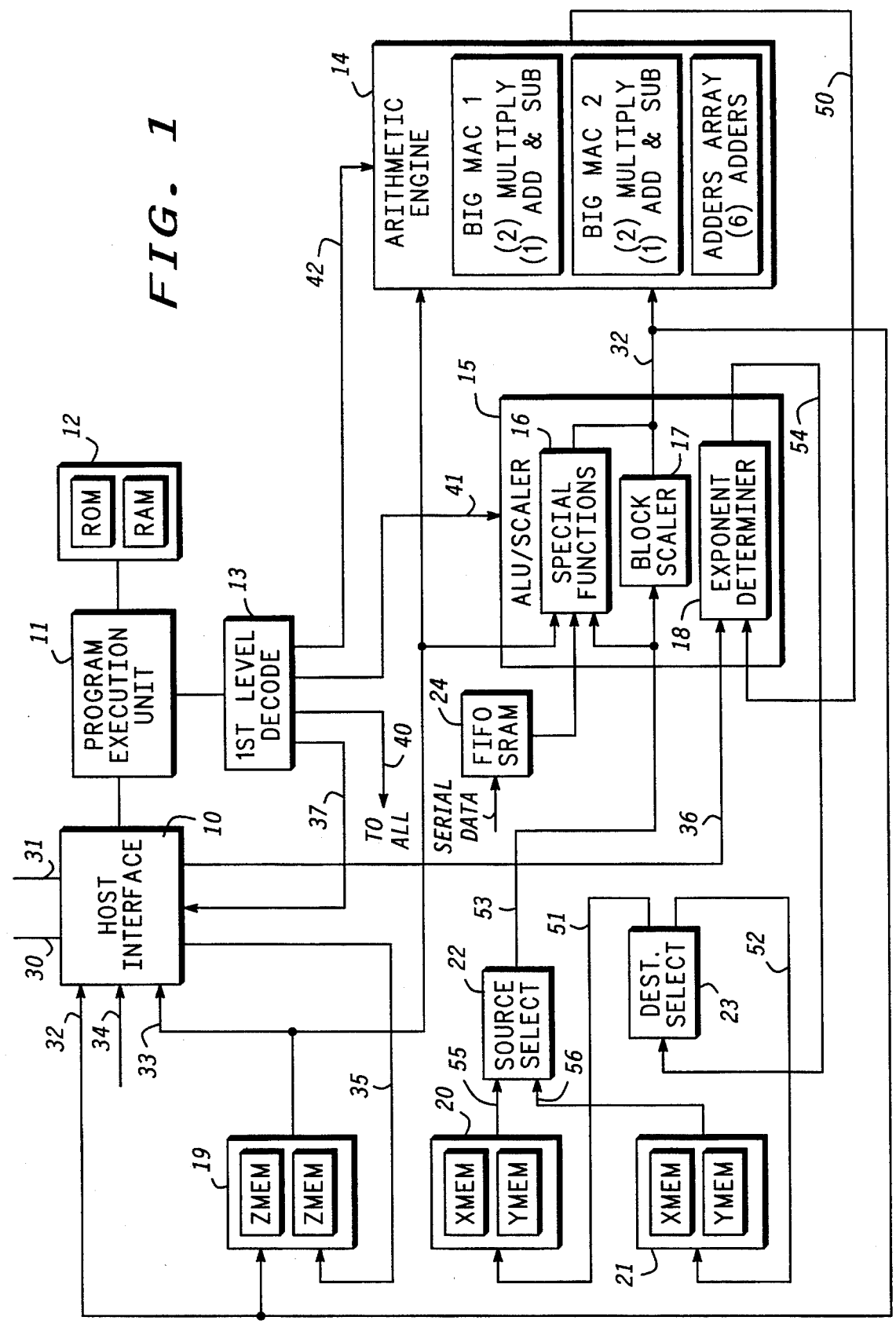
In FIG. 1, there is shown a complex arithmetic processor capable of digital signal processing.

A preferred embodiment in accordance with the present invention can be more fully understood with reference to the figures. FIG. 1 illustrates a complex arithmetic processor (CAP) or digital signal processor. The CAP includes a host interface 10, a program execution unit 11, program memory 12, a first level decoder 13, an arithmetic engine 14, an ALU/scaler 15, a first in first out (FIFO) static random access memory (SRAM) 24, source select 22, destination select 23, a complex Z memory 19 (RAM and ROM), a complex XY memory left 20 (SRAM), and a complex XY memory right 21 (SRAM). The host interface 10 is coupled to the program execution unit 11, to the Z memory 19 via the Z data in 35 and Z data out bus 33, to the first level decode 13 via the host decode bus 37, and to the ALU/scaler 15 via the host data bus 36 and the engine data in bus 32. The host interface 10 is also coupled to all units in the CAP via the debug bus 34.

The host interface 10 may be used to communicate with an external processor (not shown). The host interface 10 transfers data from external devices to the three complex memories described above. To store in XY memory left 20 or XY memory right 21, the data must first pass through the exponent determiner 18 inside the ALU/scaler 15, through the destination select 23, and to the XY memory left 20 or XY memory right 21. To retrieve data from the XY memory left 20 or XY memory right 21, data must first pass through the source select 22, through the block scaler 17, to the engine data In bus 32 and to the host interface 10. Data from the host interface 10 enters the Z memory via the Z data in bus 35. The host interface 10 can also read the value of any register in any of the CAP units via the debug bus 34. The host interface 10 can control the function of the CAP through the program execution unit 11, receiving its instructions from the first level decode 13 via the host decode bus 37.

The program execution unit 11 is coupled to the program memory 12, to the first level decode 13, and to the host interface 10. The program execution unit 11 can receive commands from the host interface 10 and read instructions from the program memory 12. The program execution unit 11 sends instructions to be decoded to the first level decode 13.

The first level decode 13 is coupled to the arithmetic engine 14 via the AE decode bus 42, to the ALU/scaler 15 via the ALU decode bus 41, to the host interface 10 via the host decode bus 37, to the three complex memories described above and to the source select 22 and the destination select 23 via the all decode bus 40. The first level decoder 13 functions as a right/left switch which can be toggled to make either the left memory 20 a data source and the right memory 21 a data destination, or vice versa. The first level decode 13 parses the instruction word into defined fields for each CAP subprocessor. Each unit has its own second level decoder which controls specific functions for that unit.

The arithmetic engine 14 is coupled to the first level decoder 13 via the AE decode bus 42, to the Z memory 19 via the Z data out bus 33, and to the ALU/scaler 15 via both the engine data in 32 and engine data out busses 50. The arithmetic engine 14 contains the CAP's arithmetic resources (i.e. 4 multipliers, and 10 adders). The arithmetic engine 14 receives its instructions, e.g. an all decode signal, from the first level decode 13 and its input data from the block scaler 17. The engine data output 50 is sent to the exponent determiner 18 where a proper scaling factor is determined for the next pass of data.

The ALU/scaler 15 is coupled to the FIFO SRAM 24, to the Z memory 19 via the Z data out bus 33, to the source select 22 via the source data bus 53, to the arithmetic engine 14 via the engine data out bus 50 and the engine data in bus 32. The ALU/scaler 15 is also coupled to the host interface 10 via the host data bus 36, and to the destination select 23 via the destination data bus 54. The ALU special functions unit 16 receives data from the Z memory 19, the source data bus 53, and from the FIFO SRAM 24. The ALU special functions unit 16 performs operations like parsing, combining and normal ALU operations. The exponent determiner 18 receives results from the arithmetic engine 14, and determines by what factor to scale the data retrieved from memory. The block scaler 17 scales input data from the source select 22 and sends it to the arithmetic engine 14. The amount by which to scale the data is calculated by the exponent determiner 18 on the previous pass.

The source select 22 is coupled to the XY memory left 20 via the left data bus 55, to the XY memory right 21 via the right data bus 56, and to the ALU/scaler 15 via the source data bus 53. The source select selects either the XY memory left 20 or the XY memory right 21 as the data source. The data source data is sent to the block scaler 17 to be scaled.

The destination select 23 is coupled to the exponent determiner 18 inside the ALU/scaler 15 via the destination data bus 54. The destination select 23 is also coupled to the XY memory left 20 via destination left bus 51, and to the XY memory right 21 via the destination right bus 52. The destination select 23 receives the output data from the exponent determiner 18 inside the ALU/scaler 15 and sends it to either the XY memory left 20 or XY memory right 21. Both the source select 22 and destination select 23 switches are controlled by the all decode bus 40.

The Z memory 19 is a complex memory that is coupled to the ALU/scaler 15 via the engine data in bus 32 and the Z data out bus 33; the Z memory 19 is also coupled to the host interface 10 via the Z data in 35 and engine data in bus 32, and to the arithmetic engine 14 via the Z data out bus 33. The Z memory 19 typically receives data (e.g., coefficients for filters, and twiddle factors for FFT algorithms) from the host interface. Such data is used in conjunction with data from either the XY memory left 20 or XY memory right 21 as operands inside the arithmetic engine 14. Each memory can also be updated and used by the ALU/scaler 15.

The XY memory left 20 is a complex memory that is coupled to the source select 22 via the left data bus 55 and the destination select 23 via the destination left bus 51. The XY memory left 20 is initially loaded from the host interface 10 via the exponent determiner 18 and destination select 23. During normal operation, the XY memory left 20 acts either as a source of data or a destination for results.

The XY memory right 21 is a complex memory that is coupled to the source select 22 via the right data bus 56 and the destination select 23 via the destination fight bus 52. The XY memory right 21 is initially loaded from the host interface 10 via the exponent determiner 18 and destination select 23. During normal operation, the XY memory right 21 acts either as a source of data or a destination for results.

The following example will explain in further detail the normal operation of the CAP in FIG. 1. First, the host interface 10 receives data from another processor through the address bus 30 and data bus 31, and stores such data in XY memory left 20. The path the data takes is through the exponent determiner 18 inside the ALU/scaler 15, through the destination select 23, and to XY memory left 20. Next, data destined for the Z memory 19 passes through the host interface 10 onto the Z data in bus 35 and into the Z memory 19. The right/left switch is then toggled to make XY memory left the source of data, and XY memory right the destination for the results. The right/left switch is the control for the source and destination selects and is set by the all decode bus from the first level decode 13.

If the next instruction is an arithmetic operation, data will pass from the XY memory left 20, through the source select 22, into the block scaler 17, and into the arithmetic engine 14. The block scaler 17 shifts or scales the data the amount that was computed by the exponent determiner 18 when the data was originally being received from the host interface 10 and being stored in the XY memory left 20. Data will also pass from the Z memory 19 into the arithmetic engine 14. The arithmetic engine 14 will then perform the specific operation as defined by the first level decode on the AE decode bus 42. The result of this operation is then sent back through the exponent determiner 18, through the destination select 23, and finally to the XY memory right 21. If another pass of the data is required, the right/left switch is thrown and the XY memory right 21 becomes the source of the data, and the XY memory left 20 becomes the destination. Upon completion of the algorithm, the right/left switch is thrown and the data passes from the source memory, through the block scaler 17, onto the engine data in bus 32 and to the host interface 10 where is sent to the external processor or I/O device.

Generally, the present invention provides digital signal processing apparatus optimized for complex arithmetic processing. The complex arithmetic processor executes instructions at the clock rate primarily by providing separate memories which can be accessed simultaneously. Two complex source memories are configured to generate two complex input data streams which are inputs to a pipelined arithmetic engine. The complex data output of the arithmetic engine is stored in complex destination memory. Program memory is separate from data memory and generates an instruction stream which is decoded and parsed into micro instructions which control the various subprocessors within the CAP. This architecture uses seven separate memories and address generators to provide enough data bandwidth to match the processing capability of the four multiplier, 10 adder arithmetic engine. An additional serial data stream is provided which is buffered by a FIFO and parsed by the ALU. The pipelined arithmetic consists of four multiplier accumulators (MACs) and an adder array consisting of six adder/subtractors. The ALU is used for standard logic functions, special DSP functions, and block scale floating point operations. The host port is used by external devices to transfer data and control the CAP.

In order to make the physical location of the memories (right, left) transparent to the programmer, the memories are mapped as source and destination. At the end of a pass through an array of data, the programmer swaps which physical memories are assigned to source and destination. This feature is not just a convenience (i.e., the programmer is not required to keep track of which memory is source and destination), but it is required that loop and subroutine instructions be independent of physical memory location.

Figure 2:
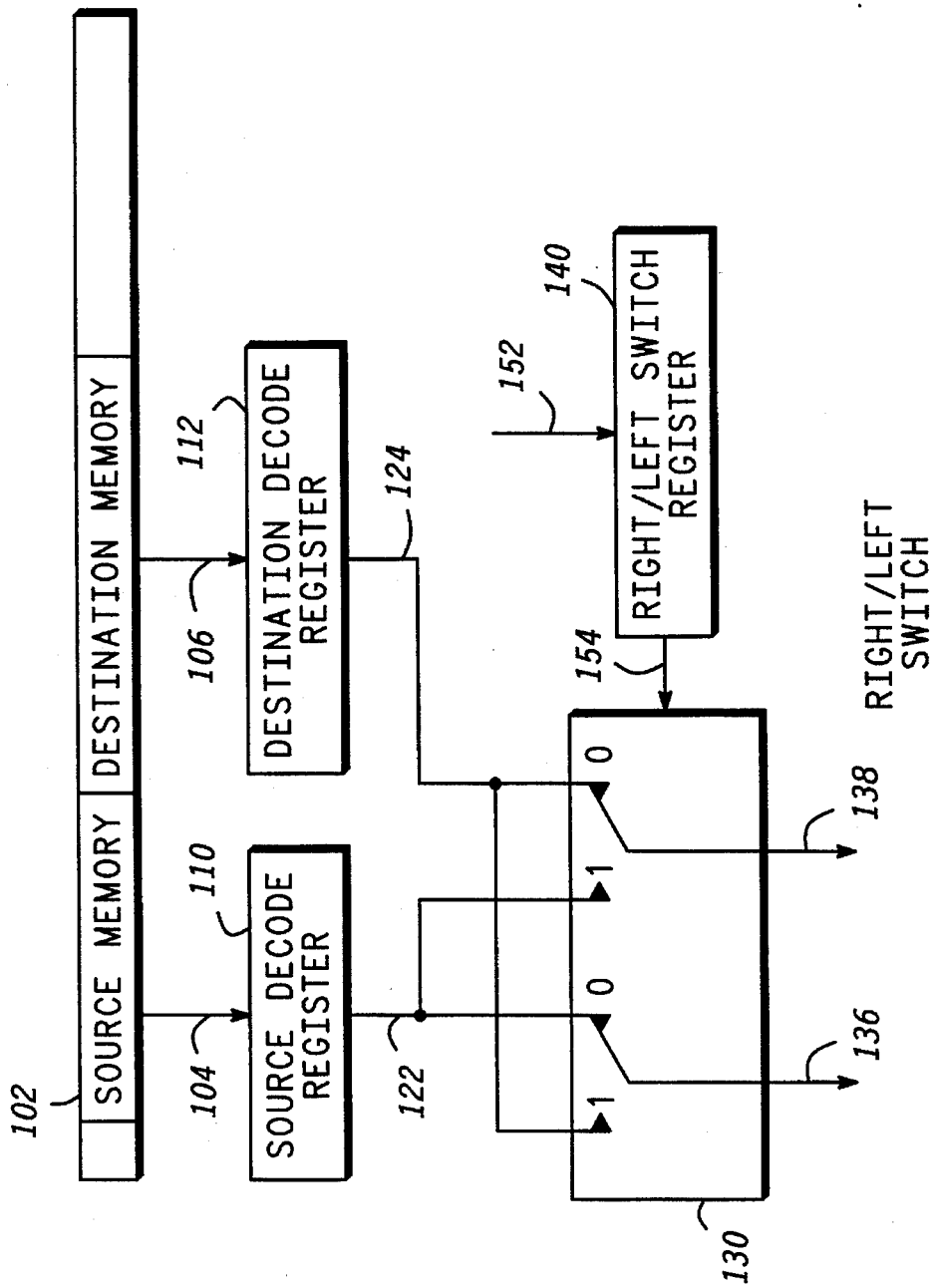
In FIG. 2, there is shown a first level decoder source/destination determiner in accordance with FIG. 1 and a preferred embodiment of the invention; and In FIG. 3, there is shown a program execution unit in accordance with FIG. 1 and a preferred embodiment of the invention.

FIG. 2 shows how the physical left and right memories are mapped to logical memory space by the right/left switch in the first level decoder 13 shown in FIG. 1. The 64 bit instruction word 102 contains two data fields which are micro instructions. The source memory instruction 104 and the destination memory instruction are parsed from instruction word 102 by source decode register 110 and destination decode register 112 for each instruction that contains an XY data move. Right/left switch 130 can route source memory decode 122 or the destination memory decode 124 to right and left memories. The state of the right/left switch is controlled by the right/left switch register 140. The data in the register can be toggled from 0 to 1 and 1 to 0 by the toggle signal 152.

While it is not unusual for computers to map several physical memories (pages) into the same address space, here there are two separate complex data streams and two separate instruction streams which must be switched. Conventional DSPs which have multiple address generators and data streams do not reassign the address generator decode fields to different address generators.

Figure 3:
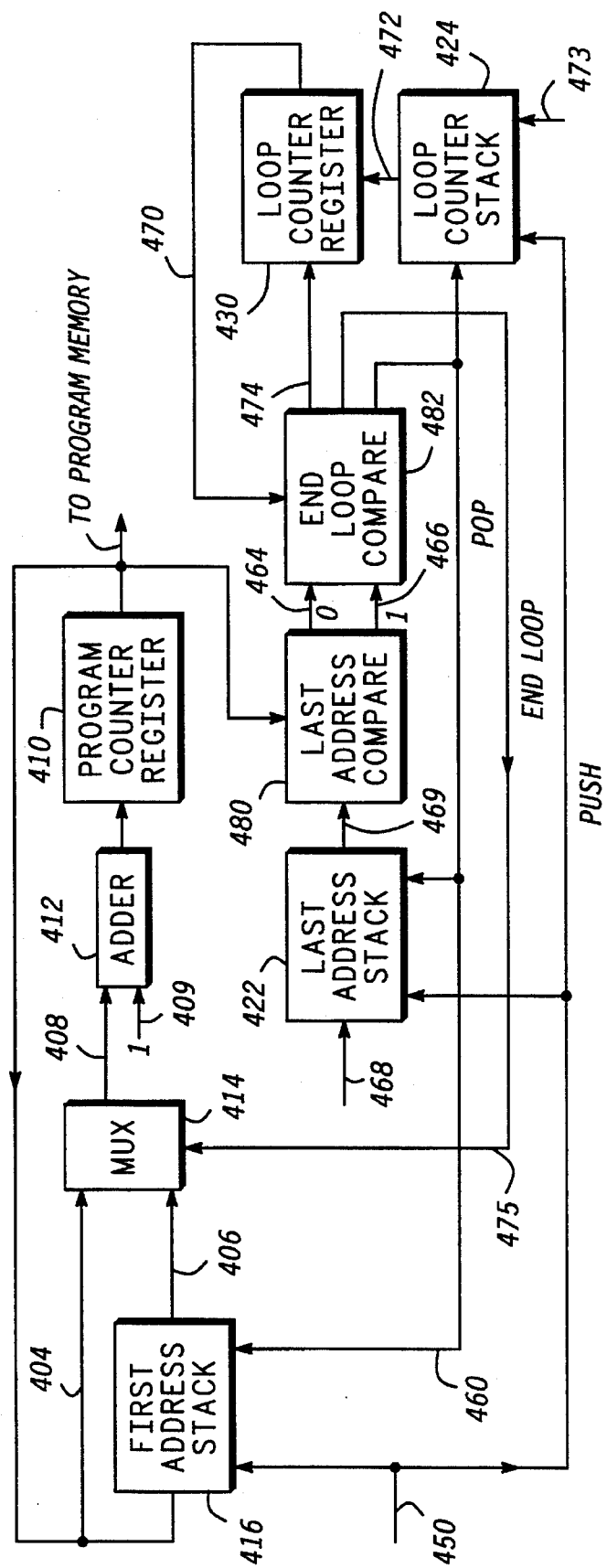

FIG. 3 illustrates the operation of the program execution unit 11 show in FIG. 1. Although the program execution unit 11 is capable of other operations, only the operation of hardware nested DO loops is shown. The program execution unit 11 is an address generator for program memory. Components in the address data path are the program counter register 410, adder 412, multiplexer (mux) 414, and first address stack 416. The components in the control path are the last address stack 422, loop counter stack 424, loop counter register 430, last address comparator 480 and end of loop comparator 482. The program counter register 410 contains the address of the next instruction to execute in program memory. A new program address 404 is generated every clock cycle by adding the number one 409 to the mux output 408 using adder 412 and storing the result in program counter register 410. Normally, the mux 414 selects the program address 404 for mux output 408. The exception is when the program address 404 is at the last instruction in the DO loop. In that case, the mux output 408 is selected from the first address stack 406 instead of the program counter register 410.

When a DO loop is activated in FIG. 3, the push stack command 450 pushes the program address 404 onto the first address stack 416, pushes the last address 468 onto the last address stack 422, and pushes the loop count 473 onto the loop count stack 424. The last address comparator 480 senses the difference between the program address 404 and the last stack address 469 and outputs the zero signal 464 and one signal 466. If the difference is 0, the decrement loop count signal 474 decrements the loop counter 430. If the current loop count 470 is also greater than 1, the jump to top signal 475 selects the first address stack output 406 for the input to mux 414. If the difference between the last stack address 469 and program address 404 is 1 and current loop count 470 is 1, the end loop comparator 482 terminates the inner DO loop by issuing the pop stack command 460. This command "pops" the outer DO loop parameters first address stack out 406, last stack address 469, and new loop count 472 off the first address stack 416, the last address stack 422, and the loop counter stack 424, respectively, referring to table 1, loop termination logic and FIG. 3).

The sequencer fetches a new instruction every clock cycle. There are no instructions that require more than one clock to execute. In order to execute a nested hardware loop, three stacks are required to save the first instruction of the loop, last instruction of the loop and loop count. In order to allow the loops to be closely nested (i.e., the beginnings and ends of the loops are located on adjacent instructions), look ahead circuitry is required. The sequencer must begin setting up for end of the outer loop before the inner loop is completed. The approach of the end of the inner loop is sensed when the difference between the program counter and last address is 1 and the loop count is 1. Information about the outer loop (first address, last address, and loop count) is stored in three separate memory stacks.

Below is an example of a nested hardware DO loop on the CAP which operates with the instructions executing at the clock rate. The following shows the stack operations of a tightly nested hardware DO loop. The example illustrates the requirement for three simultaneous stack operations and look ahead circuitry. In the following, the term PUSH means increment the stack pointer and write data to the memory stack; POP means decrement the stack pointer exposing new data to be read:

| Instruction Number | Proaram | STACK OPERATION |
|---|---|---|
| 1 | DO 10,EL1 | PUSH OUTER LOOP PARAMETERS<br>push instr 1 onto first instruction stack<br>push instr 6 (EL1) onto last instruction stack<br>push 10 (loop count) onto loop count stack |
| 2 | DO 6,EL2 | PUSH INNER LOOP PARAMETERS<br>push instr 2 onto first instruction stack<br>push instr 5 (EL2) onto last instruction stack<br>push 6 (loop count) onto loop count stack |
| 3 | instruction 1 | |
| | instruction 2 IF LOOP COUNT = 1: | pop outer loop parameters from stacks |
| 5 | EL2 instruction 3 IF LOOP COUNT = 1: | pop stacks and terminate outer loop |
| 6 | EL1 instruction 4 | |

TABLE 1

LOOP TERMINATION LOGIC

| Last Address - Program Address | Loop Count | Action |
|---|---|---|
| >1 | | Prog Addr = Prog Addr +1 |
| 0 | >1 | Decrement Loop Count<br>Prog Addr = First Address |
| 1 | =1 | Pop Stacks |
| 0 | =1 | Decrement Loop Count<br>Prog Addr = Prog Addr +1 |

Thus, a complex arithmetic processor and method has been described which overcomes specific problems and accomplishes certain advantages relative to prior art methods and mechanisms. The improvements over known technology are significant. The method and apparatus comprise a new and novel means and method for implementing tightly nested hardware DO loops executing at the clock rate. This means and method incorporates the use of three dedicated memory stacks and specialized hardware to determine the end of the loop. The approach improves over prior-art methods by providing for optimum implementation of tightly-nested hardware do-loops. In addition, the CAP or DSP delivers an order of magnitude increase in speed, power, and efficiency over other processors, including typical DSP chips and special purpose FFT chip sets. The processing resources can be integrated into a single VLSI to provide a significant improvement in overall processing efficiency.

Thus, there has also been provided, in accordance with an embodiment of the invention, a complex arithmetic processor and method that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A complex arithmetic processor comprising:

a host interface for distributing data;

a left memory and a right memory, each applied to the host interface, the left memory and the right memory for storing the data;

a Z memory coupled to the host interface, the Z memory for storing Z memory data;

a right/left switch coupled to the left memory and to the right memory, wherein the right/left switch makes the left memory a data source and a right memory data destination in a first setting, and makes the right memory the data source and the left memory the data destination in a second setting and wherein the right/left switch comprises a destination selector coupled to the exponent determiner and to both the right and left memories, the destination selector for determining a destination for the result; and an arithmetic engine coupled to the host interface, to the Z memory, and to the left and right memories, the arithmetic engine for performing an operation on the data to produce a result using the data and the Z memory data.

2. A complex arithmetic processor as claimed in claim 1, further comprising a first level decode coupled to the arithmetic engine, wherein the first level decode defines the operation to be performed by the arithmetic engine.

3. A complex arithmetic processor as claimed in claim 2, wherein the first level decoder comprises:

a source decode register for receiving a source memory instruction from an instruction word and for producing a source memory decode;

a destination decode register for receiving a destination memory instruction from the instruction word and for producing a destination memory decode;

a right/left switch register for producing a memory switch signal in response to being toggled; and a right/left switch coupled to the source decode register, to the destination decode register, and to the right/left switch register, the right/left switch for producing a left instruction decode to the left memory and a right instruction decode to the right memory in response to the memory switch signal.

4. A complex arithmetic processor as claimed in claim 2, further comprising:

a program memory; and a program execution unit coupled to the host interface, to the first level decode, and to the program memory, the program execution unit for receiving commands from the host interface and for reading instructions from the program memory.

5. A complex arithmetic processor as claimed in claim 4, wherein the program execution unit comprises:

a program counter register comprising an address of a next instruction to execute in the program memory;

an adder for adding one to a multiplexer output to create a program counter result to be stored in the program counter register;

a multiplexer for selecting a program address from the program counter register as a multiplexer output; and a first address stack for providing the multiplexer output if a program address is a last instruction in a loop.

6. A complex arithmetic processor as claimed in claim 5, wherein the program execution unit further comprises:

a last address stack for storing a last address;

a loop counter stack including a loop count;

a loop counter register;

a last address comparator for sensing the difference between the program address and the last stack address; and an end of loop comparator for determining a loop termination.

7. A complex arithmetic processor as claimed in claim 1, further comprising an exponent determiner coupled to the host interface, wherein the exponent determiner produces a scaling factor for the data.

8. A complex arithmetic processor as claimed in claim 1, further comprising an all decode bus coupled to the host interface, to the left memory, to the right memory, to the Z memory, to the right/left switch, to the arithmetic engine, and to the first level decode, the all decode bus for distributing an all decode signal from the first level decode.

9. A complex arithmetic processor as claimed in claim 8, further comprising a block scaler coupled to the source selector and to the arithmetic engine, the block scaler for shifting the data by an amount determined by the exponent determiner.

10. A complex arithmetic processor as claimed in claim 9, wherein the right/left switch comprises a source selector coupled to the left and right memories, wherein the source selector determines the data source.

11. A method for complex arithmetic processing in a computer comprising the steps of:

receiving data from a host interface;

storing the data in a left memory;

passing Z memory data through the host interface to a Z memory;

toggling a right/left switch to make the left memory a data source and a right memory a data destination;

passing the data from the left memory through a source selector;

passing the data from the source selector into a block scaler;

shifting the data by an amount determined by an exponent determiner to produce shifted data;

processing the shifted data and the Z memory data in the arithmetic engine;

performing an operation in the arithmetic engine as defined by a first level decode to produce a result;

storing the result in the right memory; and toggling the right/left switch to make the right memory the data source and the left memory the data destination and processing the shifted data and the Z memory data in the arithmetic engine to produce the result.

12. A method as claimed in claim 11, wherein the step of receiving data comprises the step of routing the data through an exponent determiner and a destination selector.

13. A method as claimed in claim 11, wherein the step of toggling the right/left switch to make the left memory a data source comprises setting the right/left switch through an all decode bus from a first level decode.

14. A method as claimed in claim 11, further comprising the steps of:

toggling the right/left switch upon completion of an algorithm; and passing the data through the block scaler and to the host interface.

15. A method as claimed in claim 11, further comprising the steps of:

receiving a source memory instruction from an instruction word in a source decode register;

producing a source memory decode;

receiving a destination memory instruction from the instruction word in a destination decode register;

producing a destination memory decode;

producing a memory switch signal in response to a toggle in a right/left switch register; and producing a left instruction decode to the left memory and a right instruction decode to the right memory in response to the memory switch signal in the right/left switch.

16. A method as claimed in claim 15, further comprising the steps of:

receiving commands from the host interface in a program execution unit; and reading instructions from the program memory.

17. A method as claimed in claim 11, further comprising the steps of:

adding one to a multiplexer output to create a program counter result to be stored in a program counter register;

selecting a program address from the program counter register as a multiplexer output; and providing a first address stack for the multiplexer output if a program address is the last instruction in a loop.

* * * * *

UNITED STATES PATENT AND TRADEMARK OFFICE
CERTIFICATE OF CORRECTION

PATENT NO. : 5,473,557
DATED : December 5, 1995
INVENTOR(S) : Calvin Wayne Harrison et al.

It is certified that error appears in the above-indentified patent and that said Letters Patent is hereby corrected as shown below:

In column 7, claim 1, line 17, delete "applied" and insert --coupled--.

Signed and Sealed this

Ninth Day of April, 1996

Attest:

BRUCE LEHMAN

Attesting Officer

Commissioner of Patents and Trademarks